March 6, 1934.　　　E. V. TAYLOR　　　1,950,276
BRAKE
Filed July 16, 1928　　　3 Sheets-Sheet 1

INVENTOR
EUGENE V. TAYLOR
BY
ATTORNEY

March 6, 1934. E. V. TAYLOR 1,950,276
BRAKE
Filed July 16, 1928    3 Sheets-Sheet 2

INVENTOR
EUGENE V. TAYLOR
BY
ATTORNEY

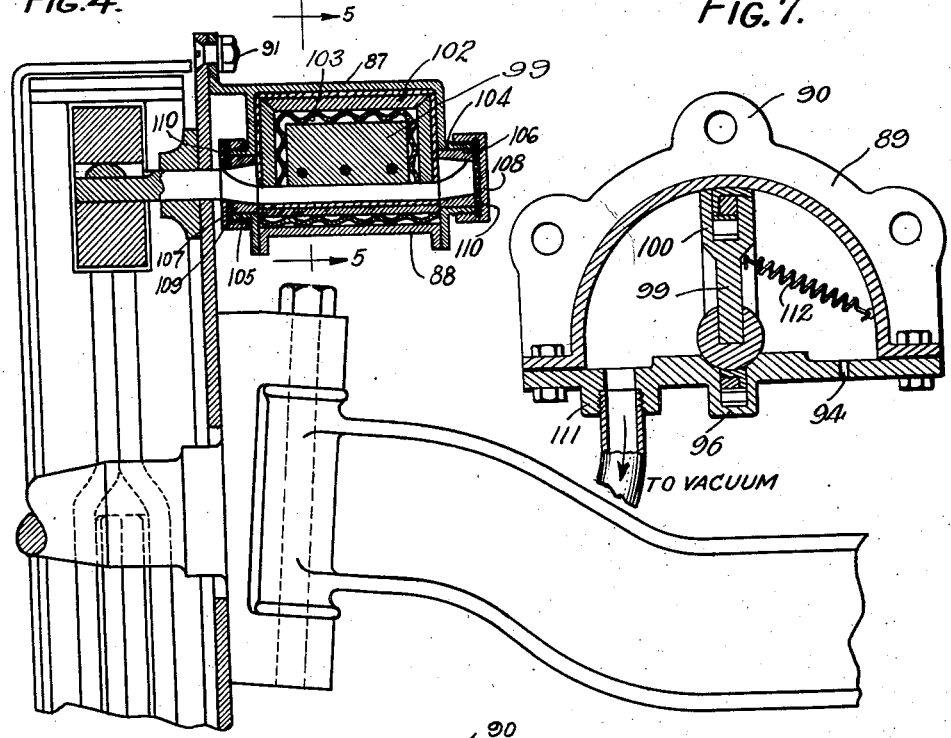

Patented Mar. 6, 1934

1,950,276

UNITED STATES PATENT OFFICE 1,950,276

BRAKE

Eugene V. Taylor, Chicago, Ill., assignor to Bendix Brake Company, South Bend, Ind., a corporation of Illinois Application July 16, 1928, Serial No. 292,943

1 Claim. (Cl. 188—152)

This invention relates to brakes for automotive vehicles and is illustrated as embodied in a hydraulic operator therefor adapted to actuate a brake of the internal expanding type.

In its broadest aspect the invention is directed to the employment of a brake operating motor means adapted to be mounted either within or without a brake backing plate, the motor to be actuated by a non-mechanical medium such as a fluid which may be air or oil. The motor may also be vacuum operated.

Heretofore adaptation of the fluid motor type of operator to the conventional internal expanding brake has been rendered difficult owing to the limited space available for mounting of the usually large and cumbersome cylinder member. This difficulty I propose to obviate by the employment of a novel non-cylindrical housing or fluid container readily adapted for mounting either on the backing plate directly above the usual king pin or within the plate at one side of the steering knuckle opening therein. Such mounting is made possible by virtue of the particular non-cylindrical shape of the container.

A further object of the invention relates to the use of a movable operating vane arranged in asymmetric relation to a brake operating shaft and in the embodiment illustrated I have provided my novel cylinder to house the movable vane, the latter to oscillate to and fro under the action of the energizing medium and return springs of the brake in the braking operation.

In one embodiment of my invention there is disclosed a two-section generally ellipsoidal housing together with a two-sectioned differential vane. Further features of the invention relate to the adjustable feature of this housing with respect to the backing plate; the particular pressure block, packing and ribbon spring combination constructed and arranged to obviate pressure loss in the cylinder; the novel flat bottomed generally semicylindrical housing with its novel shaft and vane construction, the same being but one embodiment of my invention; and to various other features of novelty and desirable particular constructions which will be apparent from the following description of the illustrated embodiments shown in the accompanying drawings, in which:

Figure 4 is a view similar to Figure 1 disclosing a modified form of operator;

Figure 5 is a section taken on the line 5—5 of Figure 4;

Figure 7 is a view similar to Figure 5 showing a vacuum actuated operator.

Figure 1:
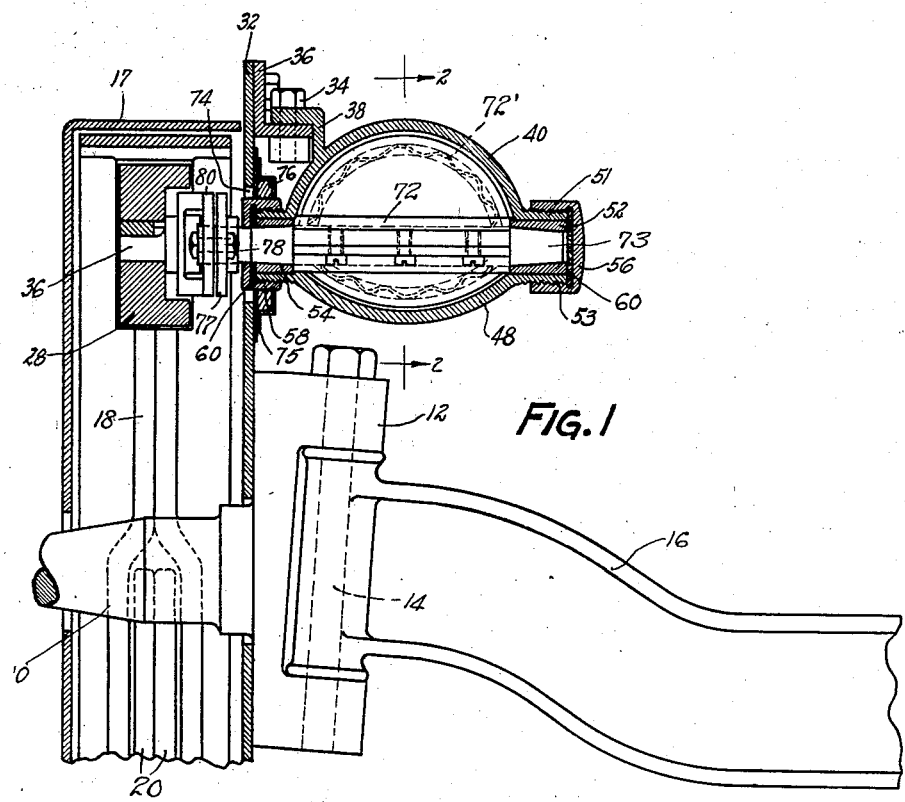
Figure 1 is a partial vertical section through a vehicle wheel and brake with my novel operator attached thereto.

In the arrangement illustrated in Figure 1, my invention is disclosed associated with the brake on a front wheel, rotatably mounted on a spindle 10 secured to a knuckle 12, the latter swiveled by a king pin 14 on the end of an axle 16 supporting the usual chassis frame (not shown).

Figure 6:
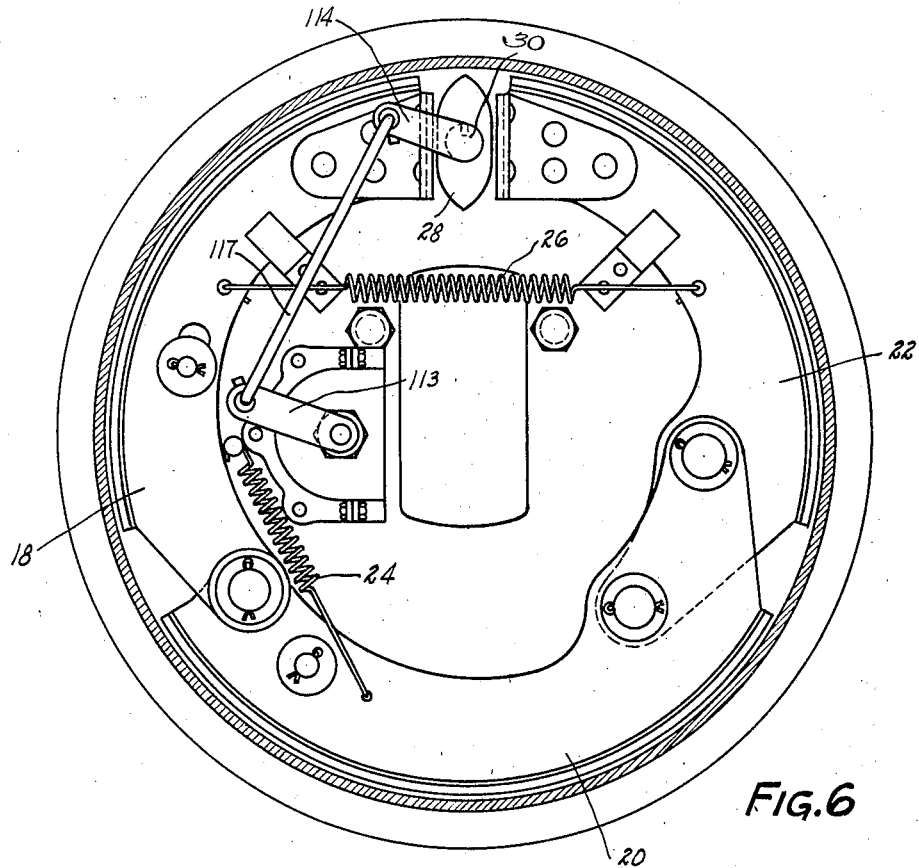
Figure 6 is a view taken just inside the head of the brake drum disclosing, in elevation, my novel operator positioned within the backing plate and connected by linkage to the brake actuating parts.

As disclosed in Figures 1 and 6, the brake includes drum 17 within which are arranged a plurality of shoes 18, 20 and 22 normally held in inoperative position by return springs 24 and 26 and adapted to be actuated by double cam 28 mounted upon shaft 30.

Figure 2:
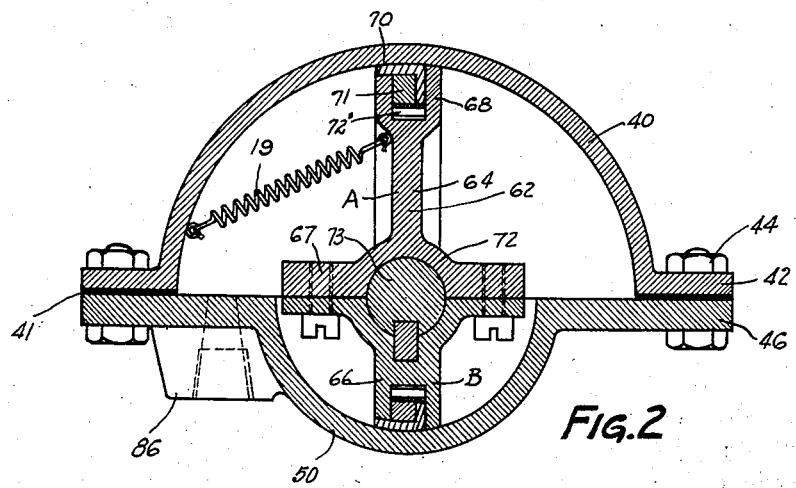
Figure 2 is a section through the operator taken on the line 2—2 of Figure 1.

My invention is particularly directed to a means for actuating the brake through the intermediary of the usual cam shaft and, as shown in Figures 1 and 2, preferably comprises a two-part housing generally ellipsoidal in outline, detachably secured to the backing plate 32 immediately above and substantially in the swiveling axis, by securing means, such as bolts 34, passed through relatively large openings in an angular flange 36 on the housing and a bracket 38 on the plate.

The upper housing part 40 is preferably curved in outline to form substantially one half of an ellipsoid and may be provided with a relatively narrow laterally extending edge flange 42 superposed upon and detachably connected, as by bolts 44, to a like flange 46 on the lower housing part 48. This part is preferably provided with a trough shaped central depression 50 curved in both longitudinal and transverse section, its flange 46 outlining an ellipse, and extending laterally from the edge thereof. Sections 40 and 48 of the housing may be provided at their ends with mating semicylindrical bearing members 51 and 53 respectively adapted to receive tapered bushings 52 and 54 and preferably externally threaded to receive caps 56 and 58, suitable packing 60 being interposed between the caps and bearings.

By virtue of this construction the motor casing is adapted to house a two-part actuating vane 62, both parts A and B thereof being preferably T-shaped in section, the web portions 64 and 66 of said parts corresponding in outline to the curved housing and the rim portions thereof secured together as by bolts 67. To obviate pressure loss, part A of the vane may be provided with an enlargement 68 which may be provided with a rectangular recess adapted to house a packing 70, preferably of leather, the latter urged against the wall of the operator by a pressure block 71 preferably of steel, which block is in turn urged outwardly by a continuous flat ribbon compression spring 72'. Part B may be provided with a similar packing structure. To further prevent such loss, a suitable gasket 41 may be interposed between the sections of the operator.

The junction of the web and rim of each T-section vane part is preferably enlarged at 72 and recessed to form a bearing for a cylindrical operating shaft 73, the latter being keyed to lower part B and journaled, at its tapered ends, in the bushings 52 and 54.

Brake operating shaft 73 extends through an opening 74 in the backing plate, the cap 58 being preferably housed therein, which opening may be surrounded by a bracket 75 retaining packing 76 to obviate the ingress of foreign matter.

Figure 3:
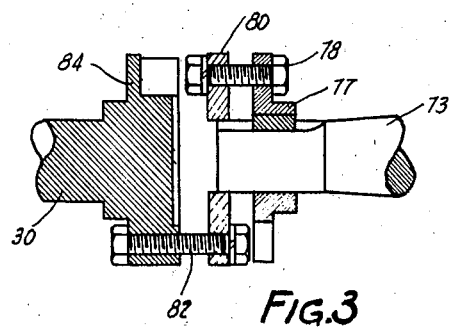
Figure 3 is an enlarged detail, in section, of the coupling connecting the brake and operator, the parts thereof being separated for clearness.

As clearly disclosed in Figure 3, a flexible coupling may be provided to connect cam 28 with shaft 73 comprising a collar 77 keyed to the shaft and secured as by bolts 78 to a flexible disc 80, the latter secured as by bolts 82 to flange 84 on the end of the cam shaft 30. Both flange 84 and collar 77 may, as disclosed in this figure, be recessed to accommodate the ends of the securing means and cam 28 may likewise be recessed to accommodate the end of the coupling, thus compacting the structure.

A suitable enlargement 86 may be provided in the base part 48 of the housing which may be internally threaded to receive a flexible or other fluid conduit.

In operation, pressure of a suitable fluid such as air or liquid admitted through inlet port 86 forces the vane to rotate, the pressure on the relatively short vane arm B offsetting or neutralizing to a degree the rotating effect of the pressure on arm A. This differential action, subtractive in effect, has a steadying or damping function, thus obviating any possible vibration or shuddering of the vane. The return springs of the brake aided by a spring 19 suitably secured to the housing and vane function to return the vane to the "brake off" position. The flexible coupling connecting the cam shaft with the operator shaft provides a structure which permits the cam to be self centering and at the same time to perform its normal function. Two or more springs such as 19 may be used if desired.

In the modification disclosed in Figures 4 and 5 I may provide, in lieu of the structure previously described, a housing or container substantially in the form of a half cylinder. This housing is preferably made in two sections 87 and 88, the upper of which may be provided at one end with a reinforcing and securing angular flange 89 having ears 90 through which pass suitable fastenings such as bolts 91 to properly secure the operator to the backing plate. The edges of the section 87 are preferably cut away and may be provided with laterally extending flanges 92 adapted to be secured as by bolts 93 to the edges of the generally U-shaped base section 88 fitting therein.

Section 88 is preferably provided with an air hole 94 and with inner and outer longitudinally extending reinforcing flanges 95 and 96. Flange 95 is preferably provided with a semicylindrical bearing recess 97 to accommodate a shaft 98. This shaft is preferably made cylindrical in cross section and may be provided with a rectangular slot to accommodate a generally rectangular-shaped actuating vane 99. Vane 99 is preferably enlarged at its outer edge at 100 and said enlargement may be provided with a rectangular slot to accommodate a packing segment 101 urged against the cylinder wall by a three-section pressure block 102 preferably of steel, the block being in turn urged outwardly by a continuous flat ribbon spring 103. Section 87 may also be provided with substantially circular end flanges 104 and 105 to house tapered bushings 106 and 107, the latter acting as bearings for the shaft 98. Caps 108 and 109 threaded on the flanges together with suitable packing 110 complete the bearing structure.

Vane 99 is preferably oscillated in moving the brake into and out of engagement with the drum by a suitable fluid under pressure such as air or oil entering the cylinder through inlet port 111, the return movement being effected by a return spring 112 aided by the return spring of the brake. Two or more air holes such as the hole 94 may be provided if desired and two or more return springs such as the return spring 112 may be provided if desired.

In Figure 7 there is shown a fluid operator in which the vane is actuated by the creation of a vacuum in the housing. Therein the housing is constructed exactly the same as the housing shown in Figure 5 and the vane is also constructed the same but is reversely inserted so that the packing 101 is reversed. The spring 112 is arranged on the opposite side of the vane and a conduit connected with a vacuum or suction is secured to the inlet port 111.

If desired, I may mount either of the described operators within the backing plate, but preferably that disclosed in Figure 6, in which event the cam shaft 30 may be connected to the actuating shaft 98 by means of crank levers 113 and 114 suitably keyed to their respective shafts and detachably engaging a connecting link 117. By virtue of the reduced size of the operator, it is admirably adapted for mounting adjacent the knuckle opening, as disclosed in the figure.

I prefer, however, to mount my novel operator outside of the backing plate immediately above the top of the king pin, its non-cylindrical shape readily adapting it for such mounting.

While two illustrative embodiments of the invention have been described in detail, it is not my intention to limit its scope to those particular embodiments, or otherwise than by the terms of the appended claim.

I claim:

In a brake operator, a steering knuckle, a backing plate secured thereto, a brake drum mounted for rotation adjacent to said backing plate, friction means positioned within said brake drum and mounted on said backing plate, a cam for moving said friction means to contact with said brake drum, a shaft secured to said cam for actuating it and extending through said backing plate, a bracket secured to said backing plate, a fluid motor casing provided with a lug and with a pair of bearings, the latter housing portions of said shaft, a plurality of vanes secured to said shaft within said housing, and a bolt by means of which said lug is secured to said bracket, the shaft serving for transmitting motion from said vanes to said cam.

EUGENE V. TAYLOR.